(No Model.) 2 Sheets—Sheet 1.
T. J. HASLAM, Jr.
SECONDARY BATTERY.
No. 416,605. Patented Dec. 3, 1889.
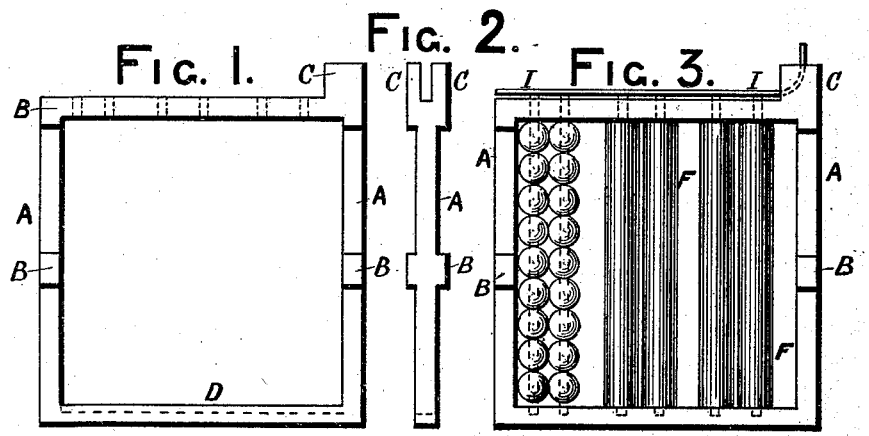
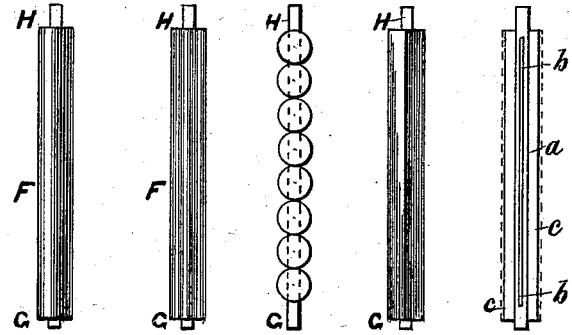
Witnesses:
J. A. Rutherford
Percy B. Hills
Inventor:
Thomas Joseph Haslam Jr
By James L. Norris.
Attorney.

(No Model.) 2 Sheets—Sheet 2.
T. J. HASLAM, Jr.
SECONDARY BATTERY.
No. 416,605. Patented Dec. 3, 1889.
Fig. 11.
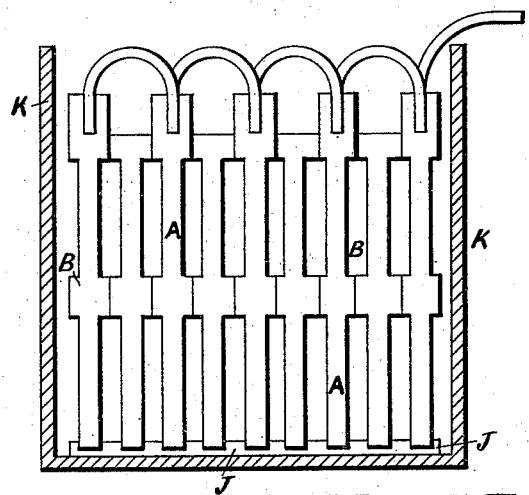
Fig. 12. Fig. 13.
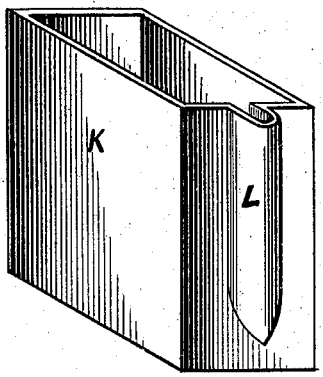 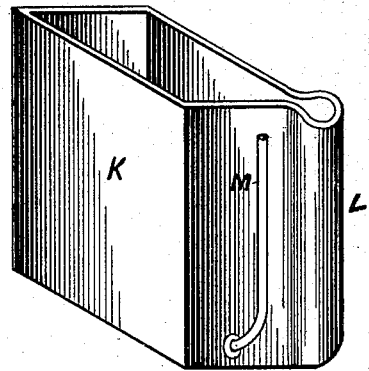
Fig. 14.
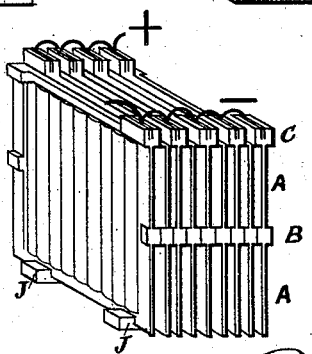
Witnesses: Inventor:
J. A. Rutherford Thomas Joseph Haslam Jr.
Percy B. Hill By James L. Norris.
Attorney.

UNITED STATES PATENT OFFICE.

THOMAS JOSEPH HASLAM, JR., OF DUBLIN, IRELAND.

SECONDARY BATTERY.

SPECIFICATION forming part of Letters Patent No. 416,605, dated December 3, 1889.

Application filed October 5, 1889. Serial No. 326,080. (No model.) Patented in England March 25, 1889, No. 5,095.

*To all whom it may concern:*

Be it known that I, THOMAS JOSEPH HASLAM, Jr., a subject of the Queen of Great Britain, residing at 105 Middle Abbey Street, Dublin, Ireland, have invented new and useful Improvements in Storage-Batteries, (for which I have obtained a patent in Great Britain, No. 5,095, bearing date March 25, 1889,) of which the following is a specification.

According to the usual method of making up storage or secondary batteries ordinary plates, punctured or otherwise, and smeared with red lead or its equivalent, have been employed within a casing or cell.

Now the object of my invention is to increase the efficiency of such storage or secondary batteries by making a frame-work of metal, wood, or other material or materials, and arranging within said frame a series of rods or pencils, of round, square, or of an irregular shape, for obtaining increase of surface, or beads or spheres threaded upon sticks of lead or other material, to hold them in a superposed manner; or such beads or spheres may be formed with projections and recesses, so that they hold one another in superposed order, the lower end of said sticks or of rods or pencils lodging in bottom recesses of the frame, and the upper ends passing through apertures and connected by lead strips, so that all of them in one frame act as a single plate. The rods may either be all of lead or other compound or compounds, or in part metallic, wood, ebonite, or of any suitable substance or substances. The frames to which these separate pieces of material are fitted are of insulating or other substance not affected by the solution or electrolyte, said frames having lugs or projections which bear against one another on each side to keep the active surfaces of the rods, pencils, surfaces, beads, or spheres apart.

In the accompanying drawings, exhibiting my invention, Figure 1 is a detail side view of one of the skeleton frames. Fig. 2 is an edge view of the same. Fig. 3 is a side view showing the rods or pencils in position; Figs. 4, 5, 6, 7, 8, 9, 10, and 10$^a$, detail views showing different forms of rods or pencils. Fig. 11 is a sectional view of a cell embodying my invention. Fig. 12 is a perspective view of a cell having a channel for a hydrometer. Fig. 13 is a similar view showing a modified construction, and Fig. 14 a perspective view of a series of the skeleton frames arranged together.

My invention will be understood by the annexed drawings, in which I show at Fig. 1 a square skeleton frame A, with projections B at the two sides and with other projections C at top, these standing out and forming stand-up lips or ears at one corner, as at Figs. 1 and 2. The bottom D of the frame has in its upper surface a series of recesses or a long groove, and the upper portion E of the frame is provided with a series of apertures at the required distances apart for spacing the rods, pencils, beads, or spheres at the required positions, as indicated at Fig. 3.

Figs. 4, 5, and 7 show examples of rods or pencils F, Fig. 4 being of circular formation, Fig. 5 in + formation, and Fig. 7 square or at an angle with the foot-piece G for taking into the recess or groove of the bottom D of the skeleton frame, and with the top step H for passing through the holes or groove in the upper plate E of the skeleton frame. The formation of these rods, Figs. 4, 5, and 7, will be understood by the plan views, Figs. 8, 9, and 10. In making the rods I sometimes use a core made in one or two parts—as, for example, a leaden tube $a$, (see Fig. 10$^a$,) with a core of iron $b$, copper, or vulcanite, or vulcanite tube with a core of lead or other material; or the core may be made entirely of lead or some other suitable material. On the core I compress the active material $c$. The internal wire in central core gives extra rigidness to the rods.

Fig. 6 represents a series of beads or spheres; but they may be of other forms of separate pieces molded or threaded upon a rod and constituting a pencil, as before described. The top steps of all the rods fitted within the skeleton frame are connected, by solder or otherwise, by a strip of lead I, as at Fig. 3, and according to the required size of the battery the requisite number of skeleton frames containing the rods, pencils, spheres, or beads are placed side by side with the lugs or projections B C touching each other and in positive and negative order, as at Fig. 14, all the plates being coupled up with each other and arranged alternately, as indicated. I prefer to place a couple of strips J J on the bottom of the cell K for the skeleton frames to rest upon, and these supports may be grooved, if desired. The position of the skeleton frames and active substances in the cell K will be understood by the sectional view, Fig. 11.

Figs. 12 and 13 represent cells K K, of novel construction, provided with a channel L, in which a hydrometer or acidometer may be introduced for ascertaining the density or strength of the electrolyte. At Fig. 12 the channel L is about mid-distance of one end, while at Fig. 13 the channel L is formed at one corner of the cell.

In lieu of making a channel, as just explained, an open tube M may be fitted for the purpose, with an opening into the cell near to the bottom. By this means the condition of the electrolyte, particularly with opaque cells or cases, can be ascertained without the cell or casing being removed.

Among the advantages derived by my invention are, first, from the form and arrangement of the frames great strength and rigidity to the plates are imparted; second, the rods, pencils, spheres, or beads present the largest surface possible of active material within a given space to the action of the changing current; third, the active material is not liable to be washed away by the boiling of the electrolyte; fourth, the active material is not liable to displacement by expansion or contraction when sudden discharges are taken, nor by the jolting to which they are subject when used for traction-work; fifth, by the plates being built up as described buckling is obviated, also short-circuiting, the loosening or falling away of the active material being avoided; sixth, internal resistance of the cell is lessened, whereby its efficiency is greatly increased; seventh, sudden heavy discharges can be taken from the cell without injury to the plates and dispenses with resistance-coils when motors are driven by the current, thus enabling the full power of the storage-battery to be switched on at the start; eighth, the plates can be renewed without difficulty by unskilled labor; ninth, any one plate, positive or negative, can be temporarily removed and replaced into the cell without materially interfering with the work of the battery. These advantages materially increase the life of the storage-battery, and from the arrangement it is much lighter, smaller, cheaper, and simpler than any known storage-battery used for lighting, traction, or motive-power purposes.

What I claim, and desire to secure by Letters Patent, is—

1. In a storage-battery, the skeleton frame A, having its side rails provided with distance-pieces B, and its top and bottom rails grooved for holding rods, pencils, spheres, or beads F of active material, substantially as described.

2. In a storage-battery, the combination of the strip I with the skeleton frame A, for the attachment of all the rods, pencils, spheres, or beads F outside the frame, substantially as described.

In witness whereof I have hereto signed my name, in the presence of two subscribing witnesses, this 30th day of August, 1889.

THOMAS JOSEPH HASLAM, JR.

Witnesses:
HENRY GARDNER,
    *Patent Agent.*
RICHARD CORE GARDNER,
*Both of 166 Fleet Street, London, England.*